US012610307B2

(12) United States Patent
Lu

(10) Patent No.: US 12,610,307 B2
(45) Date of Patent: Apr. 21, 2026

(54) METHOD AND APPARATUS FOR OBTAINING SYSTEM MESSAGE, AND TERMINAL DEVICE, AND NETWORK DEVICE

(71) Applicant: GUANGDONG OPPO MOBILE TELECOMMUNICATIONS CORP., LTD., Dongguan (CN)

(72) Inventor: Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 615 days.

(21) Appl. No.: 18/055,630

(22) Filed: Nov. 15, 2022

(65) Prior Publication Data

US 2023/0071186 A1     Mar. 9, 2023

Related U.S. Application Data

(63) Continuation of application No. PCT/CN2020/107858, filed on Aug. 7, 2020.

(51) Int. Cl.
*H04W 48/08*     (2009.01)
*H04W 48/16*     (2009.01)
*H04W 72/20*     (2023.01)

(52) U.S. Cl.
CPC ........... *H04W 48/08* (2013.01); *H04W 48/16* (2013.01); *H04W 72/20* (2023.01)

(58) Field of Classification Search
CPC ........... H04W 12/08; H04W 74/08333; H04W 40/22; H04W 48/02; H04W 68/02;
(Continued)

(56) References Cited

U.S. PATENT DOCUMENTS 10,440,628 B2 * 10/2019 Huang .............. H04W 36/0077
2008/0123543 A1 * 5/2008 Do ........................ H04W 12/06
370/252
(Continued)

FOREIGN PATENT DOCUMENTS

CN     101998272 A     3/2011
CN     102077662 A     5/2011
(Continued)

OTHER PUBLICATIONS

"IEEE Standard for Local and metropolitan area networks Part 16: Air Interface for Broadband Wireless Access Systems Amendment 1: Multihop Relay Specification," in IEEE Std 802. 16j-2009 (Amendment to IEEE Std 802.16-2009) , vol. No., pp. 1-290, Jun. 12, 2009, doi: 10.1109/IEEESTD.2009.5167148. (Year: 2009).*
(Continued)

*Primary Examiner* — William D Cumming
(74) *Attorney, Agent, or Firm* — PERKINS COIE LLP

(57) ABSTRACT

Provided are methods and apparatuses for acquiring a system message, and a terminal device and a network device. The method includes that: a remote terminal receives a first message from a relay terminal, the first message carrying a system message of a serving cell of the relay terminal, herein the first message is a discovery response message or a discovery announcement message or a first unicast message.

10 Claims, 3 Drawing Sheets

100

110

120     120

A remote terminal receives a first message from a relay terminal, the first message carrying a system message of a serving cell of the relay terminal, herein the first message is a discovery response message or a discovery announcement message or a first unicast message

201

(58) Field of Classification Search

CPC ..... H04W 68/005; H04W 76/19; H04W 4/06; H04W 36/033; H04W 48/08; H04W 48/16; H04W 36/30; H04W 36/0077; H04W 24/02; H04W 12/06; H04W 48/14; H04W 8/005

USPC ................................. 370/329, 252; 455/41.2

See application file for complete search history.

(56) References Cited

U.S. PATENT DOCUMENTS

| | | | | |
|---|---|---|---|---|
| 2014/0302786 A1 * | 10/2014 | Kasslin | ................. | H04W 8/005 |
| | | | | 455/41.2 |
| 2018/0049259 A1 | 2/2018 | Aminaka | | |
| 2018/0092022 A1 * | 3/2018 | Huang | ................. | H04W 48/16 |
| 2018/0092027 A1 | 3/2018 | Sheng | | |
| 2018/0198767 A1 * | 7/2018 | Choi | ..................... | H04W 12/08 |
| 2020/0029299 A1 | 1/2020 | Kuang et al. | | |
| 2020/0170075 A1 | 5/2020 | Xu et al. | | |
| 2022/0095269 A1 | 3/2022 | Kuang | | |
| 2022/0264280 A1 * | 8/2022 | Chang | ................. | H04W 48/14 |
| 2023/0071186 A1 * | 3/2023 | Lu | ......................... | H04W 48/08 |
| 2023/0144480 A1 * | 5/2023 | Liu | ....................... | H04W 24/02 |
| | | | | 370/329 |
| 2023/0319782 A1 * | 10/2023 | Wang | ................. | H04W 68/005 |
| | | | | 370/329 |
| 2024/0049327 A1 * | 2/2024 | Cai | ....................... | H04W 76/19 |
| 2024/0080644 A1 * | 3/2024 | Pan | ........................ | H04W 4/06 |
| 2024/0373308 A1 * | 11/2024 | Pan | ....................... | H04W 36/30 |

FOREIGN PATENT DOCUMENTS

| | | | | | |
|---|---|---|---|---|---|
| CN | 102300289 A | | 12/2011 | | |
| CN | 103856927 A | * | 6/2014 | | |
| CN | 104185162 A | * | 12/2014 | ........... | H04W 4/023 |
| CN | 105246027 A | * | 1/2016 | ........... | H04W 8/005 |
| CN | 106304258 A | * | 1/2017 | ........... | H04W 48/20 |
| CN | 103856927 B | * | 5/2017 | | |
| CN | 108307528 A | | 7/2018 | | |
| CN | 109245845 A | | 1/2019 | | |
| CN | 113039819 A | * | 6/2021 | ........ | H04W 72/1263 |
| CN | 116261912 A | * | 6/2023 | ........... | H04W 8/005 |
| CN | 116261912 B | * | 3/2025 | ........... | H04W 48/16 |
| EP | 3275231 B1 | * | 4/2019 | ........... | H04W 72/30 |
| EP | 3592041 A1 | | 1/2020 | | |
| EP | 4152888 A1 | * | 3/2023 | ........... | H04W 8/005 |
| KR | 20120074239 A | * | 7/2012 | ............. | H04B 7/155 |
| WO | WO-2016184273 A1 | * | 11/2016 | ........... | H04W 48/16 |
| WO | WO-2017003158 A1 | * | 1/2017 | ........... | H04W 12/04 |
| WO | 2018170913 A1 | | 9/2018 | | |
| WO | 2018194390 A1 | | 10/2018 | | |
| WO | WO-2022027609 A1 | * | 2/2022 | ........... | H04W 8/005 |
| WO | WO-2024187314 A1 | * | 9/2024 | ......... | H04L 12/1863 |

OTHER PUBLICATIONS

English translation of CN 113039819, Sep. 2025 (Year: 2025).*

ZTE. "Discussion on the Pairing, Paging and System Info Acquisition of Remote UE" 3GPP TSG-RAN WG2 Meeting #96 R2-168170, Nov. 4, 2016 (Nov. 4, 2016)—5 pages.

International Search Report in the international application No. PCT/CN2020/107858, mailed on Apr. 26, 2021 with English translation—5 pages.

English translation of the Written Opinion of the International Search Authority in the international application No. PCT/CN2020/107858, mailed on Apr. 26, 2021—9 pages.

3GPP TR 36.746 V15.1.1 (Apr. 2018), "3rd Generation Partnership Project; Technical Specification Group Radio Access Network; Study on further enhancements to LTE Device to Device (D2D), User Equipment (UE) to network relays for Internet of Things (IoT) and wearables; (Release 15)"—55 pages.

First Office Action of the Chinese application No. 202080104552.0, issued on Jun. 28, 2024, 13 pages with English translation.

First Office Action of the European application No. 20948294.2, issued on Dec. 1, 2023. 6 pages.

Second Office Action of the Chinese application No. 202080104552.0, issued on Sep. 23, 2024. 13 pages with English translation.

3GPP TS 23.303 V14.1.0 (2016-12), 3rd Generation Partnership Project; Technical Specification Group Services and System Aspects; Proximity-based services (ProSe); Stage 2 (Release 14), pp. 32-34 and 97-98.

3GPP TSG RAN WG2#98 R2-1705767, Hangzhou, China, May 15-19, 2017, Agenda item: 9.1.2.2, Source: LG, Title: Report of email discussion [97bis#18][LTE/FeD2D]—System Information, Document for: Discussion and decision. 14 pages.

3GPP TSG RAN WG2 #98 R2-1704637, Hangzhou, China, May 15-19, 2017, Title: Discussion on the system information delivery, Source: ZTE, Agenda item: 9.1.2.2, Document for: Discussion and Approval. 4 pages.

Supplementary European Search Report in the European application No. 20948294.2, mailed on May 22, 2023. 9 pages.

* cited by examiner

100
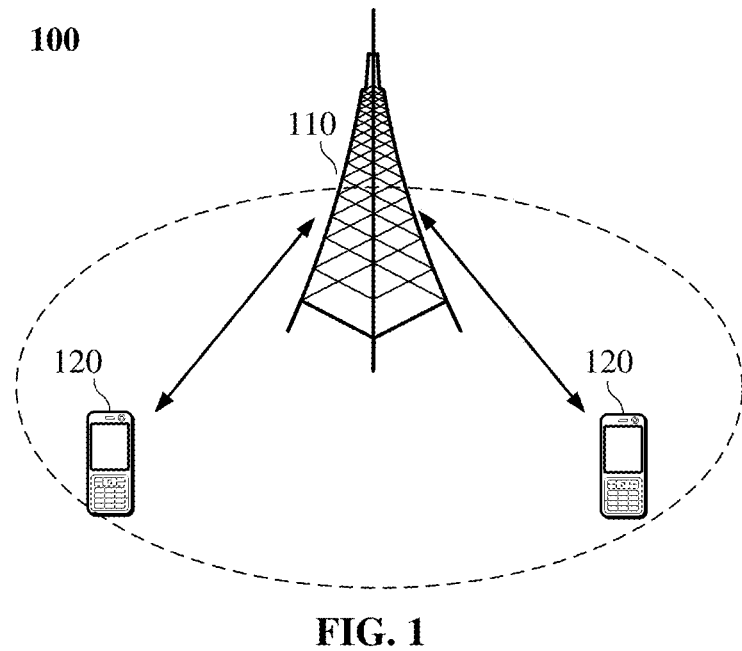
FIG. 1
| A remote terminal receives a first message from a relay terminal, the first message carrying a system message of a serving cell of the relay terminal, herein the first message is a discovery response message or a discovery announcement message or a first unicast message | 201 |
FIG. 2
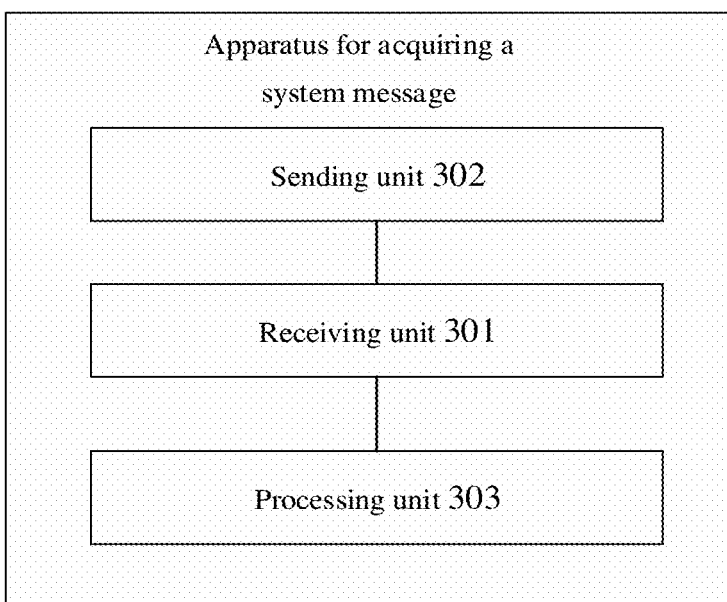
FIG. 3

METHOD AND APPARATUS FOR OBTAINING SYSTEM MESSAGE, AND TERMINAL DEVICE, AND NETWORK DEVICE

REFERENCE TO RELATED APPLICATION

This is a continuation application of International Patent Application No. PCT/CN2020/107858 filed on Aug. 7, 2020, the disclosures of which are incorporated herein by reference in their entirety.

TECHNICAL FIELD

Embodiments of the disclosure relate to the technical field of mobile communication, and in particular, to a method and an apparatus for acquiring a system message, and a terminal device and a network device.

BACKGROUND

A remote terminal is connected to a wireless network node through one or more relay terminals. The relay terminal directly connected to the wireless network node is communicated with the wireless network node through a Uu interface of a 3rd Generation Partnership Project (3GPP) system. For example, the relay terminal may receive, through the Uu interface, a message system from the wireless network node. However, the remote terminal also needs to acquire a system message, and how the remote terminal acquires the system message is required to be specified.

SUMMARY

Embodiments of the disclosure provide methods and an apparatuses for acquiring a system message, a terminal device, and a network device.

A method for acquiring a system message provided by an embodiment of the disclosure may include the following operation.

A remote terminal receives a first message from a relay terminal. The first message carries a system message of a serving cell of the relay terminal. The first message is a discovery response message or a discovery announcement message or a first unicast message.

A method for acquiring a system message provided by an embodiment of the disclosure may include the following operation.

A relay terminal sends a first message to a remote terminal. The first message carries a system message of a serving cell of the relay terminal. The first message is a discovery response message or a discovery announcement message or a first unicast message.

An apparatus for acquiring a system message provided by an embodiment of the disclosure may be applied to a remote terminal and may include a receiving unit.

The receiving unit is configured to receive a first message from a relay terminal. The first message carries a system message of a serving cell of the relay terminal. The first message is a discovery response message or a discovery announcement message or a first unicast message.

An apparatus for acquiring a system message provided by an embodiment of the disclosure may be applied to a relay terminal and may include a sending unit.

The sending unit is configured to send a first message to a remote terminal. The first message carries a system message of a serving cell of the relay terminal. The first message is a discovery response message or a discovery announcement message or a first unicast message.

A terminal device provided by an embodiment of the disclosure may include a processor and a memory. The memory is configured to store a computer program. The processor is configured to call and run the computer program stored in the memory to perform the abovementioned method for acquiring a system message.

A network device provided by an embodiment of the disclosure may include a processor and a memory. The memory is configured to store a computer program. The processor is configured to call and run the computer program stored in the memory to perform the abovementioned method for acquiring a system message.

A chip provided by an embodiment of the disclosure is configured to implement the abovementioned method for acquiring a system message.

Specifically, the chip includes a processor, configured to call and run a computer program in a memory to enable a device installed with the chip to perform the abovementioned method for acquiring a system message.

A non-transitory computer readable storage medium provided by an embodiment of the disclosure is configured to store a computer program. The computer program enables a computer to execute the abovementioned method for acquiring a system message.

A computer program product provided by an embodiment of the disclosure may include a computer program instruction. The computer program instruction enables the computer to execute the abovementioned method for acquiring a system message.

A computer program provided by an embodiment of the disclosure enables a computer to execute the abovementioned method for acquiring a system message when running on the computer.

BRIEF DESCRIPTION OF THE DRAWINGS

The accompanying drawings described herein are used to provide a further understanding of the disclosure, and constitute a part of the disclosure. The exemplary embodiments of the disclosure and the description thereof are used to explain the disclosure, but do not constitute improper limitations to the disclosure. In the accompanying drawings:

FIG. 1 illustrates a schematic diagram of communication system architecture provided by an embodiment of the disclosure;

FIG. 2 illustrates a schematic flowchart of a method for acquiring a system message provided by an embodiment of the disclosure;

FIG. 3 illustrates a schematic diagram 1 of structural compositions of an apparatus for acquiring a system message provided by an embodiment of the disclosure;

DETAILED DESCRIPTION

Figure 4:
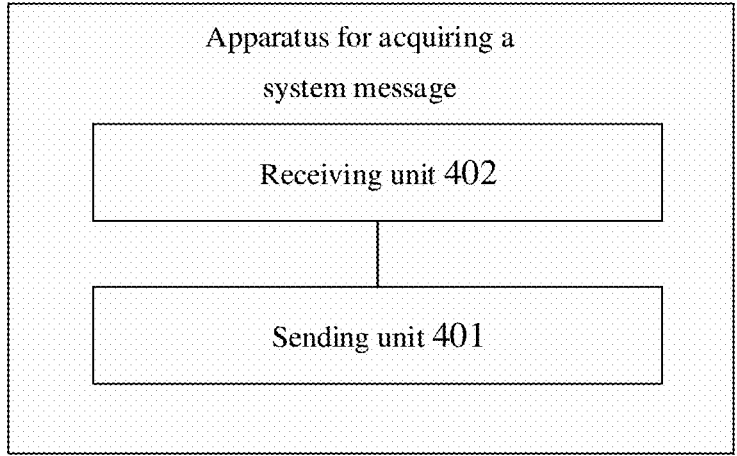
FIG. 4 illustrates a schematic diagram 2 of structural compositions of an apparatus for acquiring a system message provided by an embodiment of the disclosure.

The technical solutions in the embodiments of the disclosure are described below with reference to the accompanying drawings in the embodiments of the disclosure. It is apparent that the described embodiments are part of rather than all embodiments of the disclosure. All other embodiments obtained by those of ordinary skill in the art based on the embodiments of this disclosure without creative efforts shall fall within the scope of protection of this disclosure.

The technical solutions of the embodiments of the disclosure may be implemented in various communication systems, for example, a Long Term Evolution (LTE) system, an LTE Frequency Division Duplex (FDD) system, an LTE Time Division Duplex (TDD) system, a 5G (5th generation) communication system, a future communication system, etc.

In an example, the communication system 100 applied in the embodiments of the disclosure is as shown in FIG. 1. The communication system 100 may include a network device 110. The network device 110 may be a device in communication with a terminal 120 (or called a communication terminal or a terminal). The network device 110 may provide communication coverage for a specific geographical area, and may communicate with a terminal located within the coverage. In some embodiments, the network device 110 may be an Evolutional Node B (eNB or eNodeB) in the LTE system or a wireless controller in a Cloud Radio Access Network (CRAN). Or the network device may be a mobile switching center, a relay station, an access point, an on-board device, a wearable device, a hub, a switch, a network bridge, a router, a network-side device in a 5G network, or a network device in a future communication system.

The communication system 100 may further include at least one terminal 120 located within the coverage of the network device 110. A "terminal" used herein includes, but not is limited to, an apparatus arranged to receive/transmit a communication signal through a wired line connection, such as through Public Switched Telephone Network (PSTN), Digital Subscriber Line (DSL), digital cable and direct cable connections, and/or another data connection/network, and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or an Internet of Things (IoT) device. The terminal arranged to communicate through a wireless interface may be called a "wireless communication terminal", a "wireless terminal" or a "mobile terminal". Examples of the mobile terminal include, but are not limited to, satellite or cellular phones, Personal Communications System (PCS) terminals that can combine cellular radiotelephones with data processing, fax, and data communication capabilities, PDAs that can include radiotelephones, pagers, Internet/Intranet access, Web browsers, notebooks, calendars, and/or Global Positioning System (GPS) receivers, and conventional laptop and/or hand-held receivers or other electronic devices including radiotelephone transceivers. The terminal may also be referred to as a User Equipment (UE), a subscriber unit, a subscriber station, a mobile console, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (Session Initiation Protocol, SIP) phone, a Wireless Local Loop (WLL) station, a Personal Digital Assistant (PDA), a hand-held device having a wireless communication function, a computing device or another processing device connected to a wireless modem, an on-board device, a wearable device, a terminal device in a 5G network, a terminal in a PLMN in future evolution, or the like.

In some embodiments, Device to Device (D2D) communication may be performed between the terminals 120.

In some embodiments, a 5G communication system or a 5G network may also be called a New Ratio (NR) system or an NR network.

FIG. 1 exemplarily illustrates one network device and two terminal devices. In some embodiments, the communication system 100 may include a plurality of network devices and the coverage of each network device may include other numbers of terminal devices. No limits are made thereto in the embodiments of the disclosure.

In some embodiments, the communication system 100 may further include other network entities, such as a network controller and a mobile management entity. No limits are made thereto in the embodiments of the disclosure.

It is to be understood that a device with a communication function in a network/a system in the embodiments of the disclosure may be called a communication device. Taking a communication system 100 as shown in FIG. 1 as an example, the communication device may include a network device 110 and a terminal 120 with a communication function. The network device 110 and the terminal 120 may be specific devices as described above, which will not be elaborated here. The communication device 100 may also include other devices, for example, other network entities, such as a network controller and a mobile management entity. No limits are made thereto in the embodiments of the disclosure.

It should be understood that the terms "system" and "network" herein are often used interchangeably herein. The term "and/or" herein is only an association relationship for describing associated objects and indicates that three relationships may exist. For example, A and/or B may indicate the following three cases: only A exists, both A and B exist, or only B exists. In addition, the character "I" herein generally indicates that the contextual objects are in an "or" relationship.

In order to facilitate the understanding of the technical solutions of the embodiments of the disclosure, the technical solutions related to the embodiments of the disclosure are described below.

A remote terminal may be connected to a wireless network node through one or more relay terminals. The remote terminal and the relay terminal or the relay terminals may be connected and communicated through a PC5 interface in a 3GPP system, and the relay terminal directly connected with a wireless network node may be connected and communicated with the wireless network node through a Uu interface of the 3GPP system.

The remote terminal may discover and select the relay terminal in mode A or mode B. In the mode A, the relay terminal may periodically broadcast a discovery announcement message. The discovery announcement message may include information related to a discovery process (referred to as discovery process related information for short), such as a user identifier of the relay terminal at an application layer, or an application service identifier. In addition, the discovery announcement message may also include information about a sending period of the discovery announcement message. In the mode B, the remote terminal may send a discovery request message. The discovery request message may include the discovery process related information, such as a user identifier of the remote terminal at an application layer, or an application service identifier. If the relay terminal is granted to respond to the remote terminal, then a discovery response message may be sent to the remote terminal.

It is to be noted that the remote terminal in the embodiment of the disclosure may also be referred to as "remote UE", and the relay terminal in the embodiment of the disclosure may also be referred to as "relay UE".

FIG. 2 illustrates a schematic flowchart of a method for acquiring a system message provided by an embodiment of the disclosure. As shown in FIG. 2, the method for acquiring a system message includes the following operations.

At S201: A remote terminal receives a first message from a relay terminal. The first message carries a system message of a serving cell of the relay terminal. The first message is a discovery response message or a discovery announcement message or a first unicast message.

In the embodiment of the disclosure, the relay terminal may send the first message to the remote terminal, and correspondingly, the remote terminal may receive the first message from the relay terminal. Here, the first message may carry the system message of the serving cell of the relay terminal.

In an example, the relay terminal may receive the system message from the serving cell through a Uu interface. The relay terminal may send the first message to the remote terminal through a PC5 interface. The first message may carry the system message.

In an implementation mode, the system message may include at least one of followings: System Information Block (SIB) 1, SIB12, SIB13, or SIB14.

In the embodiment of the disclosure, the first message may be a discovery response message or a discovery announcement message or a first unicast message. The technical solutions of the embodiments of the disclosure are described in detail below in combination with different implementations of the first message.

The first message is the discovery response message, the discovery response message carries a first container, and the first container is used for carrying the system message.

Specifically, 1: the remote terminal may send a discovery request message to the relay terminal, and correspondingly, the relay terminal may receive the discovery request message from the remote terminal, the discovery request message carrying discovery process related information of the remote terminal, and the discovery process related information of the remote terminal may include at least one of followings: a user identifier of the remote terminal at an application layer, or an application service identifier of the remote terminal; 2: the remote terminal may receive discovery response message from the relay terminal, the discovery response message carries a first container, and the first container is used for carrying the system message.

The first message is the discovery announcement message, the discovery announcement message carries a second container, and the second container is used for carrying the system message.

Specifically, the discovery announcement message may receive the discovery announcement message periodically from the relay terminal, the discovery announcement message carries a second container, and the second container is used for carrying the system message.

In an implementation mode, the discovery announcement message may further carry the discovery process related information of the relay terminal. The discovery process related information of the relay terminal may include at least one of followings: a user identifier of the relay terminal at an application layer, or an application service identifier of the relay terminal.

In an implementation mode, the discovery announcement message may further carry a sending period of the discovery announcement message.

In the embodiment of the disclosure, the discovery announcement message may be carried on a Physical Sidelink Shared Channel (PSSCH); and a Physical Sidelink Control Channel (PSCCH) associated with the PSSCH may carry Sidelink Control Information (SCI). In some embodiments, the SCI may include at least one of following identifiers: a source identifier, a target identifier, or an updating identifier.

The source identifier is used for indicating an identifier of a terminal that sends the discovery announcement message.

The target identifier has an association relationship with at least one application service.

The updating identifier is used for indicating whether content in the discovery announcement message is updated.

In the embodiment of the disclosure, the discovery announcement message may include the discovery process related information and the system message. The updating identifier is used for indicating whether the discovery process related information and/or the system message in the discovery announcement message are/is updated.

In an implementation mode, the discovery process related information and the system message in the discovery announcement message may share an updating identifier. For this case, the updating identifier is used for indicating whether at least one of the system message or the discovery process related information in the discovery announcement message is updated.

In another implementation mode, the discovery process related information and the system message in the discovery announcement message may respectively have independent update identifiers. For this case, the updating identifier may include a first sub-identifier and a second sub-identifier. The first sub-identifier is used for indicating whether the system message in the discovery announcement message is updated. The second sub-identifier is used for indicating whether the discovery process related information in the discovery announcement message is updated.

A) In an implementation mode, the remote terminal may decode the discovery announcement message carried on the PSSCH in a case that the remote terminal receives the discovery announcement message for the first time.

B) In an implementation mode, the remote terminal may determine whether the content in the discovery announcement message is updated based on the updating identifier in the SCI in response to that the remote terminal determines based on the SCI that neither the source identifier nor the target identifier changes in a case that the remote terminal does not receive the discovery announcement message for the first time.

The remote terminal does not decode the PSSCH carrying the discovery announcement message in response to determining that the content in the discovery announcement message is not updated.

The remote terminal decodes the PSSCH carrying the discovery announcement message, and acquires updated content in the discovery announcement message in response to determining that the content in the discovery announcement message is updated.

C) In an implementation mode, the remote terminal may decode the PSSCH carrying the discovery announcement message, and acquire an updated discovery announcement message in response to that the remote terminal determines based on the SCI that the source identifier and/or the target identifier change(s) in a case that the remote terminal does not receive the discovery announcement message for the first time.

In an example, the discovery announcement message may be sent to the remote terminal by the relay terminal through a PSSCH on a PC5 interface. The physical layer control channel accompanying the PSSCH is a PSCCH. The SCI included in the PSSCH indicates how to correctly receive relevant control information of the PSSCH, such as the time and frequency domain resource information of the PSSCH. In addition, the SCI may also include a source identifier, a target identifier, and an updating identifier. The source identifier is used for indicating an identifier of a terminal that sends the discovery announcement message. The target identifier has an association relationship with the application service. The updating identifier is used for indicating whether content in the discovery announcement message carried in the PSSCH is updated. The updating identifier in the SCI may also change when at least one of the discovery process related information or the system message in the discovery announcement message is updated. The discovery process related information and the system message may share one updating identifier or respectively have independent update identifiers. The updating identifier may adopt a relative marking mode. That is, the updating identifier may flip, for example, from 0 to 1 or from 1 to 0 when the content in the discovery announcement message is updated each time. The updating identifier may also be marked by an absolute value, for example, the updating identifier is a serial number of the content. When the remote terminal receives the discovery announcement message:

1. If the remote terminal is granted to receive the discovery announcement message and determines based on the SCI that the discovery announcement message including the target identifier is received for the first time, then the remote terminal may try to receive and decode the PSSCH associated with the SCI, and acquire the discovery announcement message from the PSSCH.

2. If the remote terminal is interested in the application service indicated by the discovery announcement message and measures that the wireless signaling quality of the PSSCH is greater than a specific threshold, then the remote terminal may select the relay terminal that sends the discovery announcement message.

3. The remote terminal may determine whether to periodically receive the discovery announcement message based on the source identifier, the target identifier, and the updating identifier included in the SCI after selecting the relay terminal.

4. On the premise that both the source identifier and the target identifier included in the SCI remain unchanged, if the updating identifier does not change, then the remote terminal may not decode the PSSCH. It is to be noted that the remote terminal may measure the wireless signal intensity of the PSSCH.

5. On the premise that both the source identifier and the target identifier included in the SCI remain unchanged, if the updating identifier changes, then the remote terminal may receive and decode the PSSCH, and acquire an updated discovery announcement message from the PSSCH.

6. When at least one of the source identifier or the target identifier included in the SCI changes, the remote terminal may receive and decode the PSSCH, and acquire an updated discovery announcement message from the PSSCH.

The first message is the first unicast message, the first unicast message carries a third container, and the third container is used for carrying the system message.

Specifically, the relay terminal may receive the system message from the serving cell through a Uu interface. The relay terminal and the remote terminal may establish a PC5 link. The first unicast message may be sent to the remote terminal through a PC5 interface corresponding to the PC5 link. The first unicast message carries the system message.

In an implementation mode, the relay terminal may receive an updated system message from the serving cell through the Uu interface, and send a second unicast message to the remote terminal through the PC5 interface corresponding to the PC5 link. The second unicast message may carry the updated system message. In some embodiments, the second unicast message may carry a fourth container, and the fourth container is used for carrying the updated system message.

In another implementation mode, the relay terminal may receive an updated system message from the serving cell through the Uu interface. The relay terminal and the remote terminal may establish a temporary PC5 link. A second unicast message may be sent to the remote terminal through a PC5 interface corresponding to the temporary PC5 link. The second unicast message carries the updated system message. In some embodiments, the second unicast message may carry a fourth container, and the fourth container is used for carrying the updated system message.

The technical solutions of the embodiments of the disclosure are exemplified below in combination with specific application examples. The following application examples are described by taking the system message as SIB1 as an example, and are not limited thereto. The system message may also be other SIBs, for example, SIB12, SIB13, and SIB14 related to the communication of the PC5 interface.

Application example I: in discovery mode B, a relay terminal sends a system message through a discovery response message.

1. The relay terminal resides in a cell (that is, a serving cell) and acquires SIB1 of the serving cell through a Uu interface.

2. A high layer of the remote terminal triggers a relay discovery process, so that the remote terminal sends a discovery request message. The discovery request message includes a user identifier of the remote terminal at an application layer, or an application service identifier.

3. After viewing the discovery request message, the relay terminal sends a discovery response message to the remote terminal in a case that the relay terminal is granted to respond to the discovery request message. The discovery response message includes the SIB1.

Here, SIB1 is carried in the discovery response message and serves as a container in form of a byte stream that has been encoded by the Uu interface.

4. The remote terminal receives the discovery response message, and acquires the SIB1 from the discovery response message.

Here, the remote terminal may determine based on the SIB1 whether to allow initiation of a call in the serving cell of the relay terminal.

Application example II: in discovery mode A, a relay terminal sends a system message through a discovery announcement message.

1. The relay terminal resides in a cell (that is, a serving cell) and acquires SIB1 of the serving cell through a Uu interface.

2. A high layer of the relay terminal triggers a relay discovery process, so that the relay terminal starts to periodically send the discovery announcement message. The discovery announcement message includes the SIB1.

Here, SIB1 is carried in the discovery announcement message and serves as a container in form of a byte stream that has been encoded by the Uu interface.

Further, the discovery announcement message may further include a sending period of the discovery announcement message. The discovery announcement message may be sent through a PSSCH. A PSCCH associated with the PSSCH may carry SCI. The SCI may include a source identifier, a target identifier, and an updating identifier. The updating identifier is used for indicating whether the system message is updated (for example, the updating identifier is 0).

3. A high layer of the remote terminal triggers a relay discovery process, and then starts to receive the discovery announcement messages from a relay terminal(s) around. After receiving the SCI, the remote terminal discovers based on the SCI that the discovery announcement message is received for the first time, then starts to decode the discovery announcement message carried on the PSSCH, and stores the content thereof.

Application example III: in discovery mode A, a relay terminal updates a system message through a discovery announcement message.

1. The relay terminal resides in a cell (that is, a serving cell) and acquires SIB1 of the serving cell through a Uu interface.

2. A high layer of the relay terminal triggers a relay discovery process, so that the relay terminal starts to periodically send the discovery announcement message. The discovery announcement message includes the SIB1.

Here, SIB1 is carried in the discovery announcement message and serves as a container in form of a byte stream that has been encoded by the Uu interface.

Further, the discovery announcement message may further include a sending period of the discovery announcement message. The discovery announcement message may be sent through a PSSCH. A PSCCH associated with the PSSCH may carry SCI. The SCI may include a source identifier, a target identifier, and an updating identifier. The updating identifier is used for indicating whether the system message is updated (for example, the updating identifier is 0).

3. If the remote terminal receives the discovery announcement message again after the sending period and none of the target identifier, the source identifier, and the updating identifier in the SCI associated with the discovery announcement message changes, the remote terminal selects to ignore the discovery announcement message.

4. After a period of time, the relay terminal updates the SIB1 of the Uu interface. The relay terminal includes the updated SIB1 into the discovery announcement message which is broadcast periodically, and modifies the updating identifier in the SCI (for example, updating to 1).

5. After the remote terminal receives the SCI of the updated discovery announcement message, the remote terminal learns that the updating identifier in the SCI is modified to 1, then starts to decode the discovery announcement message carried on the PSSCH, and stores the updated SIB1 in the discovery announcement message.

Application example IV: in discovery mode A, a relay terminal sends discovery process related information through a discovery announcement message.

1. A high layer of the relay terminal triggers a relay discovery process, so the relay terminal starts to periodically send the discovery announcement message. The discovery announcement message includes a user identifier of the relay terminal at an application layer, or an application service identifier.

Further, the discovery announcement message may further include a sending period of the discovery announcement message. The discovery announcement message may be sent through a PSSCH. A PSCCH associated with the PSSCH may carry SCI. The SCI may include a source identifier, a target identifier, and an updating identifier. The updating identifier is used for indicating whether the discovery process related information is updated (for example, the updating identifier is 2).

2. A high layer of the remote terminal triggers a relay discovery process, and then starts to receive the discovery announcement messages from a relay terminal(s) around. After receiving the SCI, the remote terminal discovers based on the SCI that the discovery announcement message is received for the first time, then starts to decode the discovery announcement message carried on the PSSCH, and selects the relay terminal as its relay.

Application example V: in discovery mode A, a relay terminal updates discovery process related information through a discovery announcement message.

1. A high layer of the relay terminal triggers a relay discovery process, so the relay terminal starts to periodically send the discovery announcement message. The discovery announcement message includes a user identifier of the relay terminal at an application layer, or an application service identifier.

Further, the discovery announcement message may further include a sending period of the discovery announcement message. The discovery announcement message may be sent through a PSSCH. A PSCCH associated with the PSSCH may carry SCI. The SCI may include a source identifier, a target identifier, and an updating identifier. The updating identifier is used for indicating whether the discovery process related information is updated (for example, the updating identifier is 2).

2. After a period of time, the relay terminal updates the application service identifier after the relay terminal communicates with network, and then modifies the updating identifier in the SCI (for example, to 3).

3. After the remote terminal receives the SCI of the updated discovery announcement message, the remote terminal learns that the updating identifier in the SCI is modified to 3, then starts to decode the discovery announcement message carried on the PSSCH, and stores the updated content in the discovery announcement message.

Application example VI: a relay terminal sends a system message through a unicast message and updates the system message.

1. The relay terminal resides in a cell (that is, a serving cell) and acquires SIB1 of the serving cell through a Uu interface.

2. The relay terminal sends the SIB1 through the unicast message to the remote terminal via a PC5 interface.

Here, SIB1 is carried in the unicast message and serves as a container in form of a byte stream Unicast been encoded by the Uu interface.

Here, when the relay terminal establishes a PC5 link between the relay terminal and the remote terminal for the first time, the unicast message carrying the SIB1 is sent to the remote terminal through a PC5 interface corresponding to the PC5 link.

3. When the SIB1 of the Uu interface is updated, the relay terminal sends the unicast message carrying the SIB1 is sent to the remote terminal through a PC5 interface corresponding to the PC5 link established previously. Or, when the SIB1 of the Uu interface is updated, the relay terminal establishes a temporary PC5 link between the relay terminal and the remote terminal, and sends the unicast message carrying the SIB1 to the remote terminal through a PC5 interface corresponding to the temporary PC5 link.

According to the technical solution of the embodiment of the disclosure, the discovery announcement message or the discovery response message or the unicast message may include a system message of a Uu interface, which can save transmission of broadcast messages, and reduce radio resources and power consumption of terminals. In another aspect, a mechanism for updating a discovery announcement message can prevent a remote terminal from receiving and decoding redundant PSSCHs as much as possible, so as to achieve power saving.

FIG. 3 illustrates a schematic diagram 1 of structural compositions of an apparatus for acquiring a system message provided by an embodiment of the disclosure. Applied to a remote terminal, as shown in FIG. 3, the apparatus for acquiring a system message includes a receiving unit 301.

The receiving unit 301 is configured to receive a first message from a relay terminal. The first message carries a system message of a serving cell of the relay terminal. The first message is a discovery response message or a discovery announcement message or a first unicast message.

In an implementation mode, the first message is the discovery response message, the discovery response message carries a first container, and the first container is used for carrying the system message.

In an implementation mode, the apparatus may further include a sending unit 302.

The sending unit 302 is configured to send a discovery request message to the relay terminal. The discovery request message carries discovery process related information of the remote terminal. The discovery process related information of the remote terminal includes at least one of followings: a user identifier of the remote terminal at an application layer, or an application service identifier of the remote terminal.

In an implementation mode, the first message is the discovery announcement message, the discovery announcement message carries a second container, and the second container is used for carrying the system message.

In an implementation mode, the discovery announcement message may further carry the discovery process related information of the relay terminal. The discovery process related information of the relay terminal may include at least one of followings: a user identifier of the relay terminal at an application layer, or an application service identifier of the relay terminal.

In an implementation mode, the discovery announcement message may further carry a sending period of the discovery announcement message.

In an implementation mode, the discovery announcement message may be carried on a PSSCH. A PSCCH associated with the PSSCH carries SCI. The SCI may include at least one of following identifiers: a source identifier, a target identifier, or an updating identifier.

The source identifier is used for indicating an identifier of a terminal that sends the discovery announcement message.

The target identifier has an association relationship with at least one application service.

The updating identifier is used for indicating whether content in the discovery announcement message is updated.

In an implementation mode, the updating identifier may be used for indicating whether at least one of the system message or the discovery process related information in the discovery announcement message is updated; or the updating identifier may include a first sub-identifier and a second sub-identifier; the first sub-identifier is used for indicating whether the system message in the discovery announcement message is updated; and the second sub-identifier is used for indicating whether the discovery process related information in the discovery announcement message is updated.

In an implementation mode, the apparatus may further include a processing unit 303.

The processing unit 303 is configured to decode the discovery announcement message carried on the PSSCH in a case that the discovery announcement message is received for the first time.

In an implementation mode, the apparatus may further include a processing unit 303.

The processing unit 303 is configured to: determine whether the content in the discovery announcement message is updated based on the updating identifier in the SCI in response to that the remote terminal determines based on the SCI that neither the source identifier nor the target identifier changes in a case that the remote terminal does not receive the discovery announcement message for the first time; skip decoding the PSSCH carrying the discovery announcement message in response to determining that the content in the discovery announcement message is not updated; or decode the PSSCH carrying the discovery announcement message, and acquire updated content in the discovery announcement message in response to determining that the content in the discovery announcement message is updated.

In an implementation mode, the apparatus may further include a processing unit 303.

The processing unit 303 is configured to decode the PSSCH carrying the discovery announcement message, and acquire an updated discovery announcement message in response to determining based on the SCI that the source identifier and/or the target identifier change(s).

In an implementation mode, the first message is the first unicast message, the first unicast message carries a third container, and the third container is used for carrying the system message.

In an implementation mode, the system message may include at least one of followings: SIB1, SIB12, SIB13, or SIB14.

Those skilled in the art should understand that the relevant description of the abovementioned apparatus for acquiring a system message may be understood with reference to the relevant description of the method for acquiring a system message of the embodiments of the disclosure.

FIG. 4 illustrates a schematic diagram 2 of structural compositions of an apparatus for acquiring a system message provided by an embodiment of the disclosure. Applied to a relay terminal, as shown in FIG. 4, the apparatus for acquiring a system message includes a sending unit 401.

The sending unit 401 is configured to send a first message to a remote terminal. The first message carries a system message of a serving cell of the relay terminal. The first message is a discovery response message or a discovery announcement message or a first unicast message.

In an implementation mode, the first message is the discovery response message, the discovery response message carries a first container, and the first container is used for carrying the system message.

In an implementation mode, the apparatus may further include a receiving unit 402.

The receiving unit 402 is configured to receive a discovery request message from the remote terminal. The discovery request message carries discovery process related information of the remote terminal. The discovery process related information of the remote terminal includes at least one of followings: a user identifier of the remote terminal at an application layer, or an application service identifier of the remote terminal.

In an implementation mode, the first message is the discovery announcement message, the discovery announcement message carries a second container, and the second container is used for carrying the system message.

In an implementation mode, the discovery announcement message may further carry the discovery process related information of the relay terminal. The discovery process related information of the relay terminal includes at least one of followings: a user identifier of the relay terminal at an application layer, or an application service identifier of the relay terminal.

In an implementation mode, the discovery announcement message may further carry a sending period of the discovery announcement message.

In an implementation mode, the discovery announcement message may be carried on a PSSCH. A PSCCH associated with the PSSCH may carry SCI. The SCI may include at least one of following identifiers: a source identifier, a target identifier, or an updating identifier.

The source identifier is used for indicating an identifier of a terminal that sends the discovery announcement message.

The target identifier has an association relationship with at least one application service.

The updating identifier is used for indicating whether content in the discovery announcement message is updated.

In an implementation mode, the updating identifier may be used for indicating whether the system message and/or the discovery process related information in the discovery announcement message are/is updated; or the updating identifier may include a first sub-identifier and a second sub-identifier; the first sub-identifier is used for indicating whether the system message in the discovery announcement message is updated; and the second sub-identifier is used for indicating whether the discovery process related information in the discovery announcement message is updated.

In an implementation mode, the first message is the first unicast message, the first unicast message carries a third container, and the third container is used for carrying the system message.

In an implementation mode, the apparatus may further include a receiving unit 402 and an establishment unit.

The receiving unit 402 is configured to receive the system message from the serving cell through a Uu interface.

The establishment unit (not shown in the drawings) is configured to establish a PC5 link between the relay terminal and the remote terminal.

The sending unit 401 is configured to send the first unicast message to the remote terminal through a PC5 interface corresponding to the PC5 link. The first unicast message carries the system message.

In an implementation mode, the receiving unit 402 is further configured to receive an updated system message from the serving cell through the Uu interface.

The sending unit 401 is further configured to send a second unicast message to the remote terminal through the PC5 interface corresponding to the PC5 link. The second unicast message carries the updated system message.

In an implementation mode, the receiving unit 402 is further configured to receive an updated system message from the serving cell through the Uu interface.

The establishment unit is further configured to establish a temporary PC5 link between the relay terminal and the remote terminal.

The sending unit 401 is further configured to send a second unicast message to the remote terminal through a PC5 interface corresponding to the temporary PC5 link. The second unicast message carries the updated system message.

In an implementation mode, the second unicast message may carry a fourth container, and the fourth container is used for carrying the updated system message.

In an implementation mode, the system message may include at least one of followings: SIB1, SIB12, SIB13, or SIB14.

Those skilled in the art should understand that the relevant description of the abovementioned apparatus for acquiring a system message may be understood with reference to the relevant description of the method for acquiring a system message of the embodiments of the disclosure.

Figure 5:
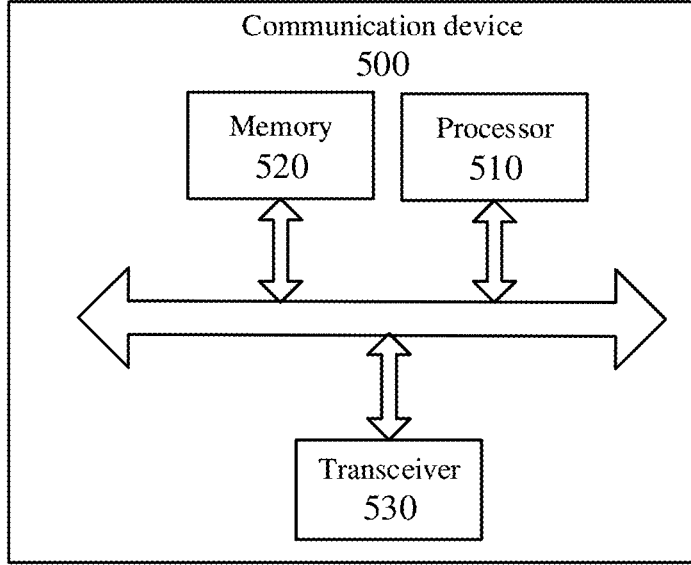
FIG. 5 illustrates a schematic structural diagram of a communication device provided by an embodiment of the disclosure.

FIG. 5 illustrates a schematic structural diagram of a communication device 500 provided by an embodiment of the disclosure. The communication device may be a terminal device, or may be a network device. The communication device 500 as shown in FIG. 5 includes a processor 510. The processor 510 may call and run a computer program from a memory to implement the method in the embodiment of the disclosure.

In some embodiments, as shown in FIG. 5, the communication| device 500 may further include a memory 520. The processor 510 may call and run the computer program from the memory 520 to implement the method in the embodiments of the disclosure.

The memory 520 may be independent of the processor 510, or may be integrated into the processor 510.

In some embodiments, as shown in FIG. 5, the communications device 500 may also include a transceiver 530. The processor 510 may control the transceiver 530 to be in communication with other devices, specifically, to send information or data to other devices, or receive the information or data from other devices.

The transceiver 530 may include a transmitter and a receiver. The transceiver 530 may further include an antenna. There may be one or more antennae.

In some embodiments, the communications device 500 may specifically be a network device of the embodiment of the disclosure, and the communication device 500 may implement corresponding flows implemented by the network device in various methods of the embodiments of the disclosure, which will not be elaborated here for simplicity.

In some embodiments, the communications device 500 may specifically be a mobile terminal/a terminal device of the embodiment of the disclosure, and the communication device 500 may implement corresponding flows implemented by the mobile terminal/the terminal device in various methods of the embodiments of the disclosure, which will not be elaborated here for simplicity.

Figure 6:
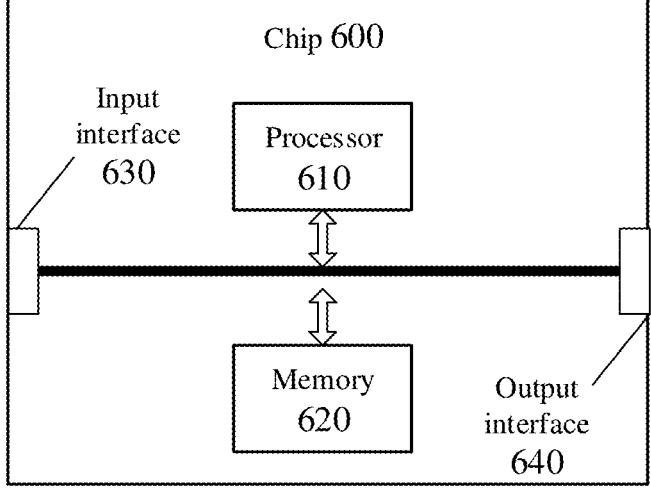
FIG. 6 illustrates a schematic structural diagram of a chip according to an embodiment of the disclosure.

FIG. 6 illustrates a schematic structural diagram of a chip according to an embodiment of the disclosure. The chip 600 as shown in FIG. 6 includes a processor 610. The processor 610 may call and run a computer program from a memory to implement the method in the embodiments of the disclosure.

In some embodiments, as shown in FIG. 6, the chip 600 may further include a memory 620. The processor 610 may call and run the computer program from the memory 620 to implement the method in the embodiments of the disclosure.

The memory 620 may be independent of the processor 610, or may be integrated into the processor 610.

In some embodiments, the chip 600 may further include an input interface 630. The processor 610 may control the input interface 630 to be in communication with other devices or chips, specifically, to acquire the information or data from other devices or chips.

In some embodiments, the chip 600 may further include an output interface 640. The processor 610 may control the output interface 640 to be in communication with other devices or chips, specifically, to output information or data sent to other devices or chips.

In some embodiments, the chip may be applied to a network device in the embodiments of the disclosure, and the chip may implement corresponding flows implemented by the network device in various methods of the embodiments of the disclosure, which will not be elaborated here for simplicity.

In some embodiments, the communications device may specifically be a mobile terminal/a terminal device of the embodiment of the disclosure, and the chip may implement corresponding flows implemented by the mobile terminal/the terminal device in various methods of the embodiments of the disclosure, which will not be elaborated here for simplicity.

It should be understood that the chip mentioned in the embodiment of the disclosure may also be called a system-level chip, a system chip, a chip system, or a system on chip, etc.

Figure 7:
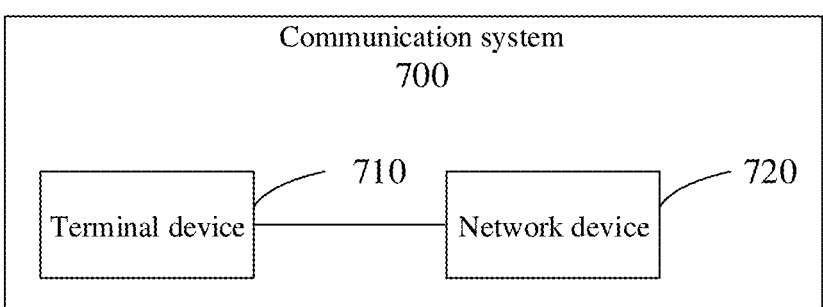
FIG. 7 illustrates a schematic block diagram of a communication system provided by an embodiment of the disclosure.

FIG. 7 is a schematic block diagram of a communication system 700 provided by an embodiment of the disclosure. As shown in FIG. 7, the communication system 700 includes a terminal device 710 and a network device 720.

The terminal device 710 may be configured to realize corresponding functions realized by the terminal device in the abovementioned method, and the network device 720 may be configured to realize corresponding functions realized by the network device in the abovementioned method, which will not be elaborated here for simplicity.

It should be understood that the processor of the embodiments of the disclosure may be an integrated circuit chip with signal processing capacity. In an implementation process, various operations of the abovementioned method embodiments may be completed by an integrated logic circuit of hardware in the processor or an instruction in the form of software. The abovementioned processor may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components. Various methods, operations, and logical block diagrams of the disclosure in the embodiments of the disclosure may be implemented or performed. The general-purpose processor may be a microprocessor, any conventional processor, or the like. Steps of the methods disclosed with reference to the embodiments of the disclosure may be directly performed and accomplished by a hardware decoding processor, or may be performed and accomplished by a combination of hardware and software modules in the decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the operations in the foregoing methods in combination with hardware of the processor.

It may be understood that the memory in the embodiments of the disclosure may be a volatile memory or a nonvolatile memory, or may include a volatile memory and a nonvolatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described in this specification includes but is not limited to these and any other proper types of memories.

It should be understood that the abovementioned memories are exemplary but not restrictive, for example, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM). That is to say, the memories described in the embodiment of the disclosure are intended to include, but not limited to, these and any other suitable types of memories.

The embodiments of the disclosure further provide a non-transitory computer readable storage medium, which is configured to store a computer program.

In some embodiments, the non-transitory computer readable storage medium may be applied to a network device in the embodiments of the disclosure. The computer program enables a computer to execute corresponding flows implemented by the network device in each method of the embodiments of the disclosure, which will not be elaborated here for simplicity.

In some embodiments, the non-transitory computer readable storage medium may be applied to a mobile terminal/a terminal device in the embodiments of the disclosure. The computer program enables a computer to execute corresponding flows implemented by the mobile terminal/the terminal device in each method of the embodiments of the disclosure, which will not be elaborated here for simplicity.

The embodiments of the disclosure further provide a computer program product, which includes a computer program instruction.

In some embodiments, the computer program product may be applied to a network device in the embodiments of the disclosure. The computer program instruction enables a computer to execute corresponding flows implemented by the network device in each method of the embodiments of the disclosure, which will not be elaborated here for simplicity.

In some embodiments, the computer program product may be applied to a mobile terminal/a terminal device in the embodiments of the disclosure. The computer program instruction enables a computer to execute corresponding flows implemented by the mobile terminal/the terminal device in each method of the embodiments of the disclosure, which will not be elaborated here for simplicity.

The embodiments of the disclosure further provide a computer program.

In some embodiments, the computer program may be applied to a network device in the embodiments of the disclosure. The computer program runs in a computer to enable the computer to execute corresponding flows implemented by the network device in each method of the embodiments of the disclosure, which will not be elaborated here for simplicity.

In some embodiments, the computer program may be applied to a mobile terminal/a terminal device in the embodiments of the disclosure. When running on a computer, the computer program enables a computer to execute corresponding flows implemented by the mobile terminal/the terminal device in each method of the embodiments of the disclosure, which will not be elaborated here for simplicity.

Those of ordinary skill in the art may be aware that the units and algorithm operations in the examples described with reference to the embodiments disclosed in this specification can be implemented by electronic hardware or a combination of computer software and electronic hardware. Whether the functions are performed by hardware or software depends on particular disclosures and design constraints of the technical solutions. Those skilled in the art may implement the described functions in different ways for each specific disclosure, but such implementation should not be considered beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the disclosure, it should be understood that the disclosed system, apparatus, and method may be implemented in other modes. For example, the described apparatus embodiment is merely schematic. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network elements. Some or all of the units may be selected based on actual requirements to achieve the objectives of the solutions of the embodiments.

In addition, functional units in the embodiments of the disclosure may be integrated into one processing unit, or each of the units may exist alone physically, or two or more units are integrated into one unit.

When the functions are realized in a form of a software functional unit and sold or used as an independent product, they may be stored in a non-transitory computer readable storage medium. Based on such an understanding, the technical solutions of the disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of the disclosure. The abovementioned storage medium includes: various media capable of storing program codes such as a U disk, a mobile hard disk, a ROM, a RAM, a magnetic disk, or an optical disk.

The above descriptions are merely specific implementation modes of the disclosure, but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

The invention claimed is:

1. A method for acquiring a system message, comprising:

receiving, by a remote terminal, a first message from a relay terminal, the first message carrying a system message of a serving cell of the relay terminal, wherein the first message is a discovery announcement message, wherein the discovery announcement message carries a second container, and the second container is used for carrying the system message of the serving cell of the relay terminal, wherein the discovery announcement message is carried on a physical sidelink shared channel (PSSCH), wherein a physical sidelink control channel (PSCCH) associated with the PSSCH carries sidelink control information (SCI), the SCI comprising at least one of following identifiers:

a source identifier, the source identifier being used for indicating an identifier of a terminal that sends the discovery announcement message;

a target identifier, the target identifier having an association relationship with at least one application service; or an updating identifier, the updating identifier being used for indicating whether content in the discovery announcement message is updated, wherein the method further comprises:

determining, by the remote terminal, whether the content in the discovery announcement message is updated based on the updating identifier in the SCI in response to that the remote terminal determines based on the SCI that neither the source identifier nor the target identifier changes in a case that the remote terminal does not receive the discovery announcement message for first time;

skipping, by the remote terminal, decoding the PSSCH carrying the discovery announcement message in response to determining that the content in the discovery announcement message is not updated; or decoding, by the remote terminal, the PSSCH carrying the discovery announcement message, and acquiring updated content in the discovery announcement message in response to determining that the content in the discovery announcement message is updated;

or,
wherein a physical sidelink control channel (PSCCH) associated with the PSSCH carries sidelink control information (SCI), the SCI comprising at least one of following identifiers:

a source identifier, the source identifier being used for indicating an identifier of a terminal that sends the discovery announcement message;

a target identifier, the target identifier having an association relationship with at least one application service; or an updating identifier, the updating identifier being used for indicating whether content in the discovery announcement message is updated, wherein the method further comprises:

decoding, by the remote terminal, the PSSCH carrying the discovery announcement message, and acquiring an updated discovery announcement message in response to that the remote terminal determines based on the SCI that at least one of the source identifier or the target identifier changes;

or, wherein the method further comprises:

decoding, by the remote terminal, the discovery announcement message carried on the PSSCH in a case that the remote terminal receives the discovery announcement message for first time.

2. The method of claim 1, wherein the discovery announcement message further carries discovery process related information of the relay terminal, and the discovery process related information of the relay terminal comprises at least one of followings: a user identifier of the relay terminal at an application layer, or an application service identifier of the relay terminal.

3. The method of claim 1, wherein the discovery announcement message further carries a sending period of the discovery announcement message.

4. The method of claim 1, wherein
the updating identifier is used for indicating whether at least one of the system message or the discovery process related information in the discovery announcement message is updated; or
the updating identifier comprises a first sub-identifier and a second sub-identifier, wherein the first sub-identifier is used for indicating whether the system message in the discovery announcement message is updated, and the second sub-identifier is used for indicating whether the discovery process related information in the discovery announcement message is updated.

5. The method of claim 1, wherein the system message comprises at least one of followings: system information block (SIB) 1, SIB12, SIB13, or SIB14.

6. A remote terminal, comprising: a processor and a memory for storing a computer program,
wherein the processor is configured to invoke and execute the computer program stored in the memory to cause the remote terminal to receive a first message from a relay terminal, the first message carrying a system message of a serving cell of the relay terminal, wherein the first message is a discovery announcement message,
wherein the discovery announcement message carries a second container, and the second container is used for carrying the system message,
wherein the discovery announcement message is carried on a physical sidelink shared channel (PSSCH), wherein a physical sidelink control channel (PSCCH) associated with the PSSCH carries sidelink control information (SCI), the SCI comprising at least one of following identifiers:

a source identifier, the source identifier being used for indicating an identifier of a terminal that sends the discovery announcement message;

a target identifier, the target identifier having an association relationship with at least one application service; or an updating identifier, the updating identifier being used for indicating whether content in the discovery announcement message is updated, wherein the processor is configured to invoke and execute the computer program stored in the memory to cause the remote terminal to:

determine whether the content in the discovery announcement message is updated based on the updating identifier in the SCI in response to that the communication device determines based on the SCI that neither the source identifier nor the target identifier changes in a case that the communication device does not receive the discovery announcement message for first time;

skip decoding the PSSCH carrying the discovery announcement message in response to determining that the content in the discovery announcement message is not updated; or decode the PSSCH carrying the discovery announcement message, and acquire updated content in the discovery announcement message in response to determining that the content in the discovery announcement message is updated;

or, wherein a physical sidelink control channel (PSCCH) associated with the PSSCH carries sidelink control information (SCI), the SCI comprising at least one of following identifiers:

a source identifier, the source identifier being used for indicating an identifier of a terminal that sends the discovery announcement message;

a target identifier, the target identifier having an association relationship with at least one application service; or an updating identifier, the updating identifier being used for indicating whether content in the discovery announcement message is updated, wherein the processor is configured to invoke and execute the computer program stored in the memory to cause the remote terminal to:

decode the PSSCH carrying the discovery announcement message, and acquire an updated discovery announcement message in response to that the communication device determines based on the SCI that at least one of the source identifier or the target identifier changes;

or, wherein the processor is configured to invoke and execute the computer program stored in the memory to cause the remote terminal to:

decode the discovery announcement message carried on the PSSCH in a case that the communication device receives the discovery announcement message for first time.

7. The remote terminal of claim 6, wherein the discovery announcement message further carries discovery process related information of the relay terminal, and the discovery process related information of the relay terminal comprises at least one of followings: a user identifier of the relay terminal at an application layer, or an application service identifier of the relay terminal.

8. The remote terminal of claim 6, wherein the discovery announcement message further carries a sending period of the discovery announcement message.

9. The remote terminal of claim 6, wherein the updating identifier is used for indicating whether at least one of the system message or the discovery process related information in the discovery announcement message is updated;

or the updating identifier comprises a first sub-identifier and a second sub-identifier, wherein the first sub-identifier is used for indicating whether the system message in the discovery announcement message is updated, and the second sub-identifier is used for indicating whether the discovery process related information in the discovery announcement message is updated.

10. The remote terminal of claim 6, wherein the processor is configured to invoke and execute the computer program stored in the memory to cause the remote terminal to:

receive the discovery announcement message through the PSSCH on a PC5 interface.

* * * * *